April 16, 1940.　　　　F. SHENTON　　　　2,197,320
ELECTRIC CONTROL VALVE
Filed Dec. 6, 1937　　　2 Sheets-Sheet 1

Inventor
Francis Shenton
By A. Yates Dowell
Attorney

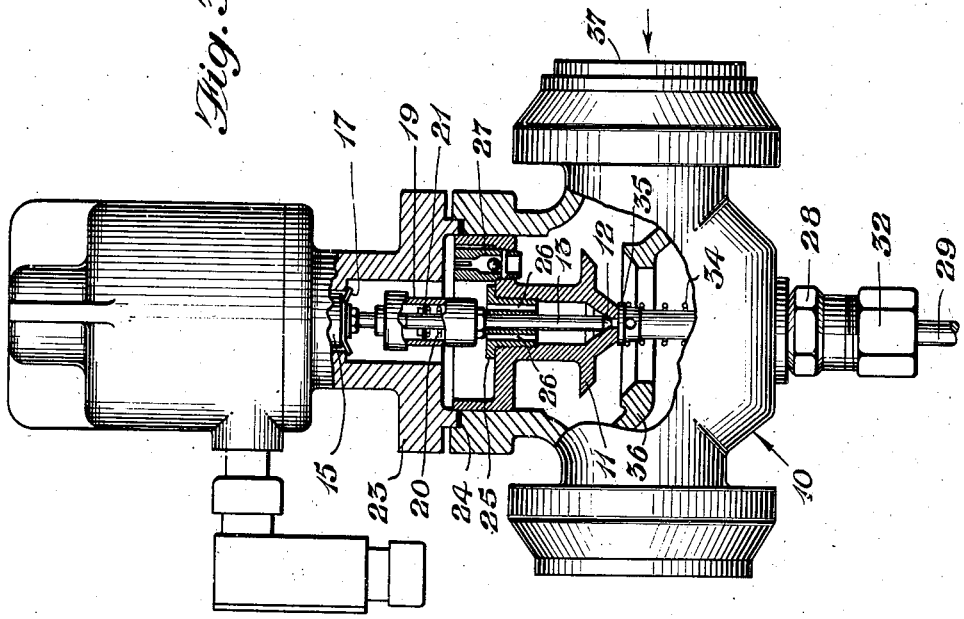
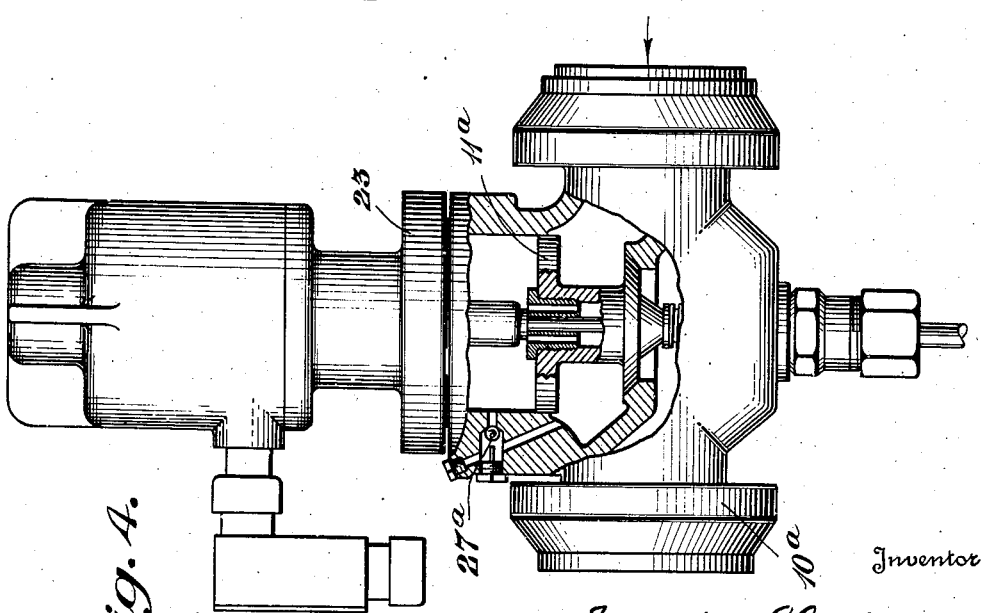

Patented Apr. 16, 1940

2,197,320

UNITED STATES PATENT OFFICE 2,197,320

ELECTRIC CONTROL VALVE

Francis Shenton, Waynesboro, Pa., assignor to Frick Company, Waynesboro, Pa., a corporation of Pennsylvania Application December 6, 1937, Serial No. 178,406

5 Claims. (Cl. 137—139)

This invention relates to valves and more particularly to automatically operated valves.

The automatic operation of valves directly by electro-magnetic means presents certain practical difficulties which must be overcome if commercial success is to be effected. For example, when such valves are to be utilized in high pressure lines, the force required to open said valves by electro-magnetic means is so large as to necessitate utilizing electro-magnets of great capacity which is uneconomical and not feasible.

It has heretofore been proposed in connection with valves of this type that a pilot valve be associated with the electro-magnetic means which in turn will relieve the pressure on the upper side of the main valve which very pressure may then be utilized to open said main valve. Such valve structures have been found to be erratic, irregular in action, and sometimes inoperative to function at critical times.

It is an improved valve of this type that the applicant has invented which is positive in action, non-sticking and operative to function at all times when movement of the pilot valve is effected either manually or automatically.

An object of the invention is to provide means for facilitating the operation of valves in high pressure lines.

A further object of the invention is the provision of auxiliary valve means to facilitate the operation of a main valve.

Other objects and advantages of the invention will become obvious from the following description taken in conjunction with the drawings, wherein:

Fig. 3 is a view partly in elevation and partly in section showing the main valve in open position; and, Fig. 4 is a view partly in elevation and partly in cross section showing a modified form of my invention.

Figure 2:
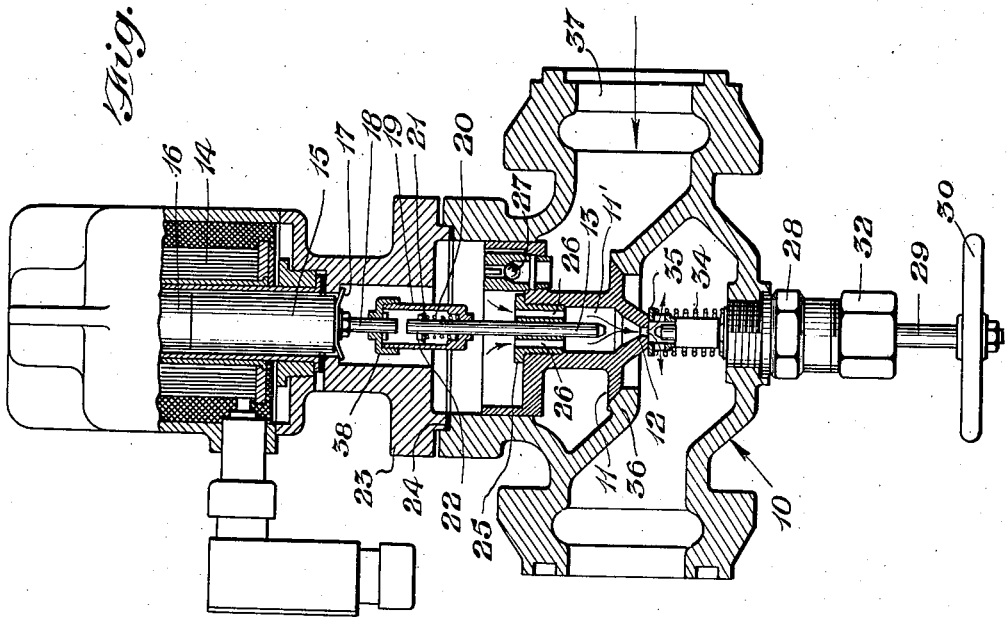
Fig. 2 is a similar view showing the pilot valve actuated and the main valve about to open.

Referring to the drawings, I have shown a valve body 10 and in association therewith a main valve 11 having a central bore 11' and auxiliary valve 11 seat 12 for cooperation with pilot valve 13. The operation of the pilot valve 13 is dependent upon electro-magnetic means 14 which upon energization attracts plunger or core 15 which is caused to move upwardly to stop 16 thereby flexing spring means 17 as shown in Figure 2. Rigidly associated with the plunger 15 is a rod 18 operating spring housing 19 which encases spring 20 through pin 38 for lifting pilot valve 13 clear of its seat 12. This is accomplished by means of hammer blow effect obtained by contact of lower internal portion of housing 19 with washer 21, said washer imparting a hammer blow to stem 13 through pin 22 as the magnet coil is energized and lifts plunger 15 together with its auxiliary mechanism as described.

Cooperating with the valve body 10 is a bonnet 23 arranged thereabove and sealed thereto by suitable means through the medium of gasket 24. The upper portion of said valve bonnet 23 houses the electro-magnetic coils or means 14 which may be said to be the prime mover which effects operation of the valve.

Associated with the central portion of said main valve 11 is a pilot valve guide 25 which is bored at 26 to permit the passage of fluid therethrough. Also associated with said main valve 11, in the preferred form of my invention, is a ball check valve 27 with the usual stops associated therewith. The ball check is so arranged to permit the passage of fluid upwardly when the pressure in the space below it is in such relation with the pressure above that the fluid velocity through the ball check valve mechanism is not of sufficient magnitude to carry the ball check upward. This provides an equalizing vent utilized in closing the valve which is explained later. The main valve has a piston-cylinder relationship with the upper inner walls of the valve body 10.

At the lower portion of the valve 10 a bonnet 28 is screwed thereto for the passage therethrough of valve lifting stem 29 operated by handwheel 30. About said stem is a suitable packing 31 held in operative relationship with the stem 29 in said bonnet 28 by packing nut 32. Said lifting stem 29 is arranged in screw bearing relationship 33 with interior of bonnet 28 in a manner such that when handwheel is rotated the stem 29 will be moved axially to raise or lower valve 11 in relation to its seat 36 through bearing means 35 on lower portion of main valve 11, thereby affording manual operation of said valve when energizing current to magnet coil 14 is not available. Helical spring 34 acts on bearing means 35 in contact with lower portion of main valve 11 and is of sufficient strength to overbalance the weight of main valve 11 thereby providing means for holding said main valve in full open position when fluid pressures between inlet and outlet of valve casing 37 are equal as when valve is in its open position. Spring 34 is also designed to compress and allow main valve 11 to reseat at 36 when additional weight of plunger 15 and auxiliary parts are added thereto as is the case when magnet coil 14 is de-energized.

In operation, the main valve will rest against its seat 36 and will be held thereon by relatively high fluid pressure at the inlet to the valve casing 37. To open the main valve it is necessary to energize the electro-magnet 14 which energization may be effected by means of a manual switch, thermostatic switch, pressure actuated switch, or other means in a manner to attract plunger 15 upwardly to stop 16 thereby flexing spring means 17 to the position shown in Fig. 2 whereupon pilot valve 13 will be drawn upwardly to its open position by force transmitted through spring or cushioning means 20 relieving the pressure above the main valve 11. With this release of pressure and resulting rapid inrush of fluid from the main valve inlet through the ball check valve 27, the ball check valve 27 will close and shut off communication between the main valve inlet and the top of the piston so that the pressure above the piston equalizes with the outlet pressure. The inlet pressure at 37 then acts on the under side of the piston-like upper portion of the valve 11, with the ball check in closed position to raise the main valve to the position shown in Fig. 3. Then the ball check valve 27 drops and opens communication between the inlet and the top of the piston. Valve 11 is then maintained in open position by means of spring 34 through bearing means 35.

To close the main valve it is but necessary to cause de-energization of electro-magnet means 14, either manually or automatically. Plunger 15 will then drop by reason of the gravitational force and effect the lowering of the main valve 11 to its seat 36 whereby flow through the valve body 10 will cease. During the closing cycle, equalized pressures below and above the upper portion of the main valve 11 are maintained through the check valve 27 which is in the position shown in Fig. 3. The spring means 17 is of the leaf type and is embodied in the valve unit to prevent sticking due to residual magnetism, sticky oil films between the working parts, or other similar causes.

Figure 1:
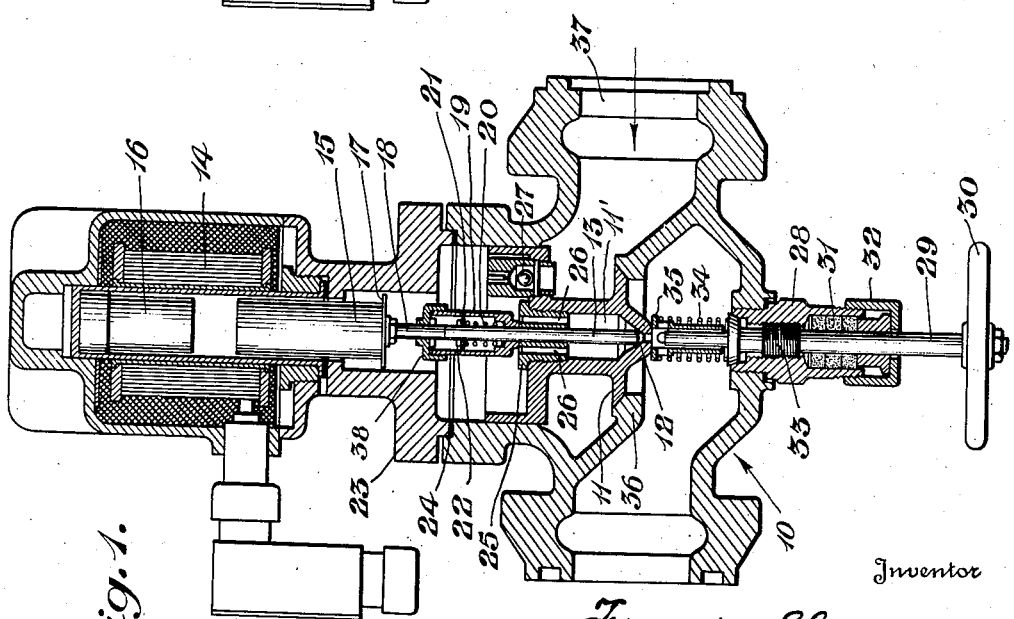
Fig. 1 is a cross sectional view of one form of my invention showing the main valve in closed position and pilot valve not actuated.

With the incorporation of the ball check relief valve in the body of the main valve, it is unnecessary in the fabrication of the entire unit to deviate from the conventional casting for the valve body 10. However, for some purposes it may be desirable to utilize a simpler form of main valve 11a as shown in Figure 4 and to incorporate the ball check relief valve 27a within the valve body casting 10a. The remaining elements of this modified form of valve are similar to that shown in Figures 1 to 3, inclusive.

It will be apparent from the above description that applicant's improved valve may be operated with the expenditure of but little energy and simultaneously effect positive action of the main valve. The well designed piston-cylinder arrangement which has been incorporated in the main valve-valve body unit, and the ball check relief valve contribute to the positive operation or lifting of the main valve and simultaneously effect the release of pressure above the main valve when the passage therethrough is closed by reason of the main valve being raised to again contact the pilot or auxiliary valve.

Applicant's valve has been well designed and proportioned so that the full force of the plunger is utilized on the pilot valve only and lifting action of the main valve 11 effected by auxiliary mechanism is no way directly connected with said pilot valve. Applicant's improved valve is quite different in structure and operation from the ordinary pilot operated main valve and is found to smoothly and effectively function to give desired results.

It will be obvious to those skilled in the art that various changes may be made in this device without departing from the spirit of the invention and therefore the invention is not limited to what is shown in the drawings and described in the specification but only as indicated in the appended claims.

I claim:

1. In a combined valve, a main valve body, a main valve, a main valve seat, said main valve including a main valve element and a piston element having a first side and a second side, said valve body including a cylinder element cooperating with said piston element, said main valve being formed with a communicating passage adapted to communicate the first side of said piston element with the outlet side of said main valve, solenoid operated pilot valve means for controlling the said communicating passage, and auxiliary pressure operated valve means controlling communication between the first side of said piston element and the inlet side of said combined valve; whereby when the solenoid operated pilot valve means is in its closed position and the auxiliary valve means is open, pressure on the inlet side of said main valve acts on the first side of said piston element and holds the said main valve in its closed position; and when the solenoid pilot valve means is open affording relief of the pressure from the first side of said piston element to the outlet side of said combined valve, the sudden rush of fluid from the inlet side of the said main valve to the first side of said piston element will effect the closing of the auxiliary pressure operated valve means and open said main valve by the action of the inlet pressure on the second side of said piston element.

2. The structure recited in claim 1, said auxiliary valve being located in said valve body.

3. The structure recited in claim 1, said auxiliary valve being located in said piston element.

4. The structure recited in claim 1, said auxiliary valve being a check valve.

5. The structure recited in claim 1, said pilot valve comprising a stem, guide means for said stem, said guide means having a passage extending therethrough and communicating the first side of said piston element with said pilot valve.

FRANCIS SHENTON.